United States Patent
Ribbeck

(10) Patent No.: US 11,305,362 B2
(45) Date of Patent: Apr. 19, 2022

(54) METHOD FOR MACHINING GEAR WHEEL WORKPIECES

(71) Applicant: Klingelnberg AG, Zürich (CH)

(72) Inventor: Karl-Martin Ribbeck, Remscheid (DE)

(*) Notice: Subject to any disclaimer, the term of this patent is extended or adjusted under 35 U.S.C. 154(b) by 221 days.

(21) Appl. No.: 16/782,164

(22) Filed: Feb. 5, 2020

(65) Prior Publication Data

US 2020/0246890 A1  Aug. 6, 2020

(30) Foreign Application Priority Data

Feb. 5, 2019 (DE) .......................... 102019102870.1

(51) Int. Cl.
*B23F 15/00* (2006.01)
*B23F 23/12* (2006.01)

(52) U.S. Cl.
CPC .............. *B23F 23/12* (2013.01); *B23F 15/00* (2013.01)

(58) Field of Classification Search
CPC .......... B23F 23/12; B23F 15/00; B23F 15/02; B23F 23/00; G05B 2219/37588; G05B 19/186; G05B 19/404; B23Q 15/12; B23Q 17/0952; Y10T 409/10–109699; G06F 2119/14; G06F 2119/00; G06F 2119/18; G06F 2119/02
USPC ...................................................... 409/1–62
See application file for complete search history.

(56) References Cited

U.S. PATENT DOCUMENTS

| | | | | |
|---|---|---|---|---|
| 4,570,389 A | * | 2/1986 | Leitch | B24B 49/00 |
| | | | | 451/21 |
| 8,307,551 B2 | * | 11/2012 | Kotthoff | B22F 5/08 |
| | | | | 29/893.3 |
| 2014/0140781 A1 | * | 5/2014 | Sjoo | B23Q 17/0966 |
| | | | | 408/8 |

(Continued)

FOREIGN PATENT DOCUMENTS

| | | |
|---|---|---|
| DE | 102005058536 A1 | 6/2006 |
| DE | 102012012617 A1 | 12/2013 |
| EP | 2570217 A1 | 3/2013 |

OTHER PUBLICATIONS

European Search Report for European Patent Application No. EP 20153857.6, dated Jun. 30, 2020, 7 pages.

*Primary Examiner* — Sarang Afzali
*Assistant Examiner* — Darrell C Ford
(74) *Attorney, Agent, or Firm* — McCarter & English, LLP

(57) ABSTRACT

A method for the chip-producing machining of a gear wheel workpiece in a machine uses a cutting tool having at least two geometrically defined cutting edges, which produce material in chip form on the gear wheel workpiece during chip-producing machining. The chip-producing machining is defined by method parameters. The method includes computer-assisted analysis of the production of chips on the multiple cutting edges of the cutting tool and computer-assisted ascertainment of relative forces which will occur on the multiple cutting edges of the cutting tool during the production of chips. The method further includes optimizing the chip-producing machining to prevent the relative forces from exceeding a predetermined limiting value or reaching a limiting range. The optimization step includes providing adapted method parameters by modifying at least one of the method parameters. Chip-producing machining of the gear (Continued)

wheel workpiece is performed using the adapted method parameter(s).

19 Claims, 6 Drawing Sheets

(56) References Cited

U.S. PATENT DOCUMENTS

| | | | | |
|---|---|---|---|---|
| 2015/0038058 | A1* | 2/2015 | Frazee | G01M 13/021 |
| | | | | 451/47 |
| 2016/0129511 | A1* | 5/2016 | Otani | B23F 1/06 |
| | | | | 409/36 |
| 2018/0221976 | A1* | 8/2018 | Yoshinaga | B23F 21/10 |
| 2018/0246494 | A1* | 8/2018 | Nakahama | G06F 15/76 |
| 2020/0047268 | A1* | 2/2020 | Kanda | B23F 23/10 |

\* cited by examiner

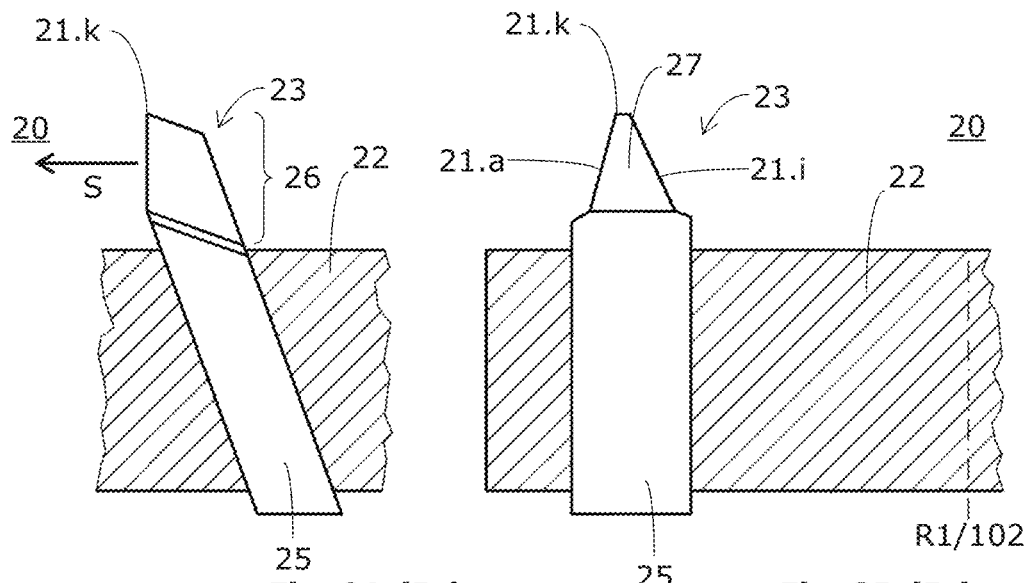
Fig. 2A (Prior Art)
Fig. 2B (Prior Art)
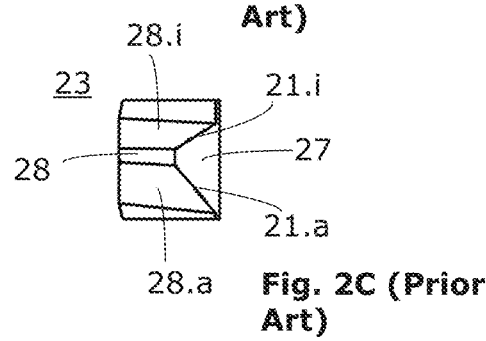
Fig. 2C (Prior Art)
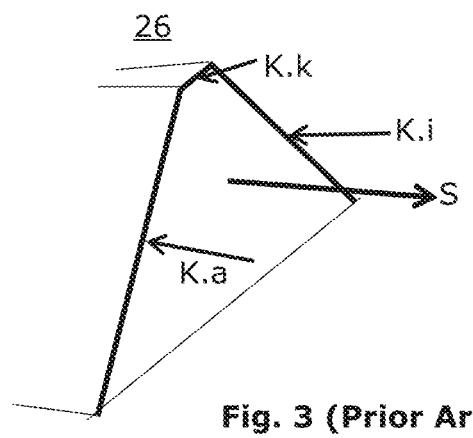
Fig. 3 (Prior Art)

| Δ1 | K.i1 | K.a1 | K.k1 |
|---|---|---|---|
|  | 1000 | 1500 | 410 |
| $K_{max}$ | 2000 | 2000 | 500 |

| Δ2 | K.i1 | K.a1 | K.k1 |
|---|---|---|---|
|  | 1600 | 2500 | 400 |
| $K_{max}$ | 2000 | 2000 | 500 |

→ 153

⋮

| Δn | K.i1 | K.a1 | K.k1 |
|---|---|---|---|
|  | 1200 | 1600 | 350 |
| $K_{max}$ | 2000 | 2000 | 500 |

Fig. 5

| Δ1 | K.i1 | K.a1 | K.k1 |
|---|---|---|---|
|  | 1000 | 1500 | 400 |
| Var. | 1100 | 1650 | 440 |
| $K_{max}$ | 2000 | 2000 | 500 |

| Δ2 | K.i1 | K.a1 | K.k1 |
|---|---|---|---|
|  | 1600 | 2500 | 480 |
| Var. | 1760 | 2750 | 528 |
| $K_{max}$ | 2000 | 2000 | 500 |

→ 153

⋮

| Δn | K.i1 | K.a1 | K.k1 |
|---|---|---|---|
|  | 1200 | 1600 | 1300 |
| Var. | 1320 | 1760 | 1430 |
| $K_{max}$ | 2000 | 2000 | 500 |

Fig. 6

| Δ1 | | | |
|---|---|---|---|
| | K.a1 | K.k1 | K.i1 |
| | {55; 60; 65; 34} | {25; 40} | {20; 60; 62; 55} |
| rK$_{max}$ | 100 | 100 | 100 |

| Δ2 | | | |
|---|---|---|---|
| | K.a1 | K.k1 | K.i1 |
| | {55; 110; 105; 34} | {30; 38} | {22; 62; 60; 50} |
| rK$_{max}$ | 100 | 100 | 100 |

METHOD FOR MACHINING GEAR WHEEL WORKPIECES

CROSS-REFERENCE TO RELATED APPLICATIONS

This application claims priority under 35 U.S.C. §§ 119(a)(d) to German patent application no. DE 10 2019 102 870.1 filed Feb. 5, 2019, which is hereby expressly incorporated by reference as part of the present disclosure.

FIELD OF THE INVENTION

The present disclosure relates to a method for the (gear cutting) machining of gear wheel workpieces.

BACKGROUND

There are greatly varying methods for the gear cutting of bevel gears. Milling methods for manufacturing bevel gears can be characterized as follows:
  indexing methods
    as a single indexing method (also called intermittent indexing method, intermittent indexing process, single indexing process, or face milling) and
    as a continuous indexing method;
  rolling
    as a rolling method and
    as a plunging method without rolling.

Moreover, a differentiation is made between completing and semi-completing methods, wherein this relates to the number of the necessary steps which are required for producing the final geometry. In the case of completing, a tool cuts using one machine setting and in the case of semi-completing, a tool cuts using two separate machine settings. In the case of semi-completing, one machine setting is used for cutting the concave flanks and the other machine setting is used for cutting the convex flanks. Furthermore, there are methods cutting on a single side, in which one tool having one machine setting cuts the concave flank and another tool having other machine settings cuts the convex flank.

These attributes of the mentioned methods are combinable with one another and are also predominantly applied in industry.

The single indexing completing method and the continuous completing method are frequently used. Fundamentals of a single indexing method are shown by way of example in FIG. 1A. To be specific, this is a single indexing completing method here. The single indexing completing method is schematically shown in FIG. 1A. In this case, the common rolling movement of bevel gear workpiece 11 and cutterhead 20, which takes place much more slowly than the rotation ω1 of the cutterhead 20, is not shown here for simplification. The illustration is a quasi-snapshot of the rolling process. The outer cutting edges 21.*a* and the inner cutting edges 21.*i* of the cutterhead 20 complete a continuous movement in the form of a circular arc. The rotational movement of the cutterhead 20 (counterclockwise here) is indicated by an arrow identified with ω1. The rotation point of the tool spindle or the point of intersection with the plane of the drawing, respectively, is identified by the reference sign 102. To manufacture further tooth gaps, the cutterhead 20 is retracted and the bevel gear workpiece 11 is rotated by an indexing angle (referred to as indexing rotation). The step-by-step further rotation (clockwise here) is indicated in FIG. 1A by the arrows a, b, and c. One tooth gap is therefore always manufactured all at once.

Expanded epicycloid (also called extended epicycloid) toothed bevel gears are manufactured by a continuous indexing method (also called continuous gear hobbing, continuous indexing process, or face hobbing). A corresponding example is schematically illustrated in FIG. 1B. A bar cutterhead 30 is used as a tool here.

In the production of the epicycloids in the continuous indexing method (see FIG. 1B), the ratio of tooth number to thread number of the bar cutterhead 30 (number of the cutter groups) corresponds to the ratio of the radius of the base circle G and the radius of the pitch circle R. One refers to an extended epicycloid if the cutterhead nominal radius, on which the cutting edges of the bar cutter are seated, is greater than the radius of the pitch circle R. In this continuous indexing method, both the cutterhead 30 and also the workpiece 11 rotate in a movement sequence chronologically adapted to one another. The indexing thus takes place continuously and all tooth gaps are produced quasi-simultaneously. The rotational movement of the cutterhead 30 is symbolized by ω2 here, while the rotational movement of the workpiece 11 is symbolized by ω3. These movements are composed of the required indexing movement and the rolling movement. FIG. 1B shows a quasi-snapshot of the rolling process. It can be seen in FIG. 1B that the bar cutters 33.*a*, 33.*i* of the bar cutterhead 30 are typically arranged in pairs (in groups, having two cutters per group). The arrangement of the bar cutters 33.*a*, 33.*i* is not concentric along a nominal circle N, as in the bar cutterhead 20 of FIG. 1A. It can be seen in FIG. 1B that the pitch circle R of the cutterhead 30 rolls along the base circle G of the workpiece 11. M identifies the center point of the cutterhead 30 here and Z1 identifies the flight circle radius.

The methods shown in FIGS. 1A and 1B can also be used as plunging methods for the production of crown gears if they are carried out without rolling.

Furthermore, there are various possibilities of processes to carry out the mentioned methods. For example, there are single rolling, plunging rolling, double rolling, and others. Greatly varying variations can be used by combination of rolling and plunging procedures and the starting and end values, and also speed profiles.

It is easy to see on the basis of FIGS. 1A and 1B that the kinematics of these methods can sometimes be very complex, since multiple movement sequences take place coordinated with one another.

It can also be seen from FIGS. 1A and 1B that—depending on the snapshot—multiple cutters can be in cutting engagement. Dynamic load changes can therefore occur.

FIG. 1C shows a schematic sectional illustration of a first machining phase of an exemplary single indexing semi-completing method according to the prior art. During this first machining phase, a left flank 53*f* of a bevel gear workpiece 11 is finish cut and simultaneously a right flank 54*v* is rough cut. In the first machining phase, the active region 26 of a bar cutter is located in a first relative position RP1. At the moment shown, a part of the outer cutting edge 21.*a*, a part of the inner cutting edge 21.*i*, and the head cutting edge 21.*k* are used for chip removing. The sections of the cutting edges 21.*a*, 21.*i*. 21.*k* which are used for chip removing are highlighted by dotted lines.

FIG. 1D shows a schematic sectional illustration of a second machining phase of the exemplary single indexing semi-completing method according to the prior art. During this second machining phase, the right flank 54*f* of the bevel gear workpiece 11 and a region of the bottom land 114 are finish cut. At the moment shown, a part of the outer cutting edge 21.a and the head cutting edge 21.k are used for chip removing. The inner cutting edge 21.i is not used.

It can also be seen on the basis of FIGS. 1C and 1D, that—depending on the machining phase—different regions of the cutting edges can be engaged in chip removing. Dynamic load changes can thus also occur due to the change of the machining faces.

The schematic illustrations of FIGS. 1A to 1D are only capable to some extent of illustrating the complexity of the dynamically changing loads. In practice, the relationships are still significantly more complex. The dynamically changing loads are dependent on numerous factors. Inter alia, the chip thickness, the number of cuts per unit of time, the cutting speed, the rigidity of the gear cutting machine and the tool, the rigidity of the cutting part of the cutters of the gear cutting tool, the shape and orientation of the cutting edges of the cutting part of the cutters of the gear cutting tool, and the material properties (such as the machinability of a material) of the gear wheel workpiece play a role, to mention only some of the influencing variables.

In addition, there is the fact that suppliers are making efforts to increase the productivity of the described methods. These are directed, inter alia, to increasing the cutting speed. The demands on the materials of the gear cutting tools and the tool service life thus increase. Cutterhead systems are used more and more frequently, since these systems offer more flexibility.

Cutterheads are the most frequently used tool form. Depending on the cutterhead type and method, bar cutters, profile cutters, or cutters having cutting plates can be used as cutters. For example, bar cutters are arranged in so-called cutter groups. A cutter group can consist, for example, of three cutters (inner cutter, middle or head cutter, and outer cutter), two cutters (inner and outer cutter), or one cutter (full cutter or inner or outer cutter).

Details of the exemplary cutterhead system can be inferred from FIGS. 2A, 2B, and 2C. Since this is a cutterhead 20 of the prior art here, the same reference signs are still used here.

A corresponding cutterhead 20 can bear, for example, multiple bar cutter groups each having at least one inner cutter 21.i and one outer cutter 21.a per cutter group, as already shown in FIG. 1A.

The cutterhead 20 of FIGS. 2A, 2B, and 2C can bear, for example, multiple bar cutters 23 each having one inner cutting edge 21.i and one outer cutting edge 21.a per bar cutter 23, as can be seen in FIG. 2A. In contrast to FIGS. 1C and 1D, the active region 26 of the bar cutter 23 has an asymmetrical shape here.

The outer cutting edge 21.a removes, depending on the gear cutting method, for example, material from the right flank 54v of a tooth gap 12 (see FIG. 1C) to rough cut this right flank 54v. Simultaneously, the inner cutting edge 21.i, depending on the gear cutting method, removes material, for example, from the left flank 53f of the tooth gap 12 to finish cut this left flank 53f (see FIG. 1C).

In a subsequent method step, the outer cutting edge 21.a can then remove further material from the right flank 54v of the tooth gap 12 (see FIG. 1D) to finish cut this right flank 54v. The finish cut flanks are identified by the reference signs 53f and 54f.

To be able to remove material from the flanks of a tooth gap 12, corresponding machine settings are predetermined by the gear cutting machine in which the cutterhead 20 is used, as already mentioned.

Further details of the cutterhead 20 shown by way of example are explained hereafter on the basis of FIGS. 2A-2C. These are solely exemplary specifications here.

A bar cutter 23 can comprise a shaft 25, which is fastened in a receptacle opening of a base body 22 of the cutterhead 20. The rake face of the bar cutter 23 is identified by the reference sign 27. The surface of the active region 26 over which the chips run off during the machining is referred to as the rake face 27. The reference sign 28 identifies the top relief surface and the reference signs 28.a, 28.i identify the two lateral relief faces. Furthermore, a head cutting edge 21.k is provided.

In principle, the individual surfaces and the angles between the surfaces of the active region 26 are defined by the assumed cutting direction and the advance direction of the gear cutting tool. The fundamental terms can be taken, for example, from the DIN norm DIN6581, Begriffe der Zerspantechnik—Bezugssystem and Winkel am Schneidteil des Werkzeugs [terms of machining technology—reference system and angles on the cutting part of the tool]," Beuth—Verlag, Berlin, 1985. However, it is also possible to use other definitions and reference systems.

To be precise, the three-dimensional geometry of the cutting edge(s) of the active region 26 is primarily defined by the three-dimensional geometry of the tooth gaps to be milled of the gear wheel workpiece and by the method kinematics. Corresponding limits are therefore placed on the design/modification of the three-dimensional geometry of the cutting edge(s).

The NC controllers of modern gear cutting machines are partially designed such that they slowly rotationally accelerate a gear cutting tool, for example, a bar cutterhead, or a predetermined acceleration profile is followed during the plunging of the gear cutting tool into the material of the gear wheel workpiece. In this manner, for example, suddenly occurring load changes can be avoided or the negative effects thereof on tool and workpiece can be reduced. The tool service life can thus sometimes be lengthened.

In addition, (software) modules are increasingly being used, which are designed to interact with the NC controller of a gear cutting machine. In this case, such a module can monitor and regulate, for example, the power consumption of an axis drive (for example, the rotational drive of the tool spindle). It is assumed in this approach that the power consumption rises proportionally with the load, which acts on the gear cutting tool. Such a module can temporarily throttle the power supply of the drive, for example, to prevent load peaks on the gear cutting tool.

In spite of these measures, significant tool wear or even premature failure of a gear cutting tool can occur, or, for example, unexpected vibrations can arise during the gear cutting.

SUMMARY

It is therefore an object of the present disclosure to provide a method and a device in order to prevent premature tool wear or even failure of a gear cutting tool and/or to suppress vibrations which can have an influence on the surface quality of the gear teeth.

It is also an object of the present disclosure to enable optimization of the utilization of the tool, wherein the term "optimization" is not to be understood in the meaning of a mathematical optimization, but rather in the meaning of a technical optimization or modification.

The present disclosure proceeds from an approach which is to enable the relative force effect on the cutting edges of a gear cutting tool to be monitored.

By way of this approach it is to be possible in at least a part of the embodiments to prevent excessively large forces from occurring instantaneously and/or locally on individual cutting edges.

Moreover, it is to be possible in at least a part of the embodiments to use the tool or the cutting edges of the tool, respectively, as productively as possible in such a way that limiting values are not exceeded at the cutting edges. The chip-producing machining can be carried out as rapidly as possible by this approach, without exceeding limiting values or leaving limiting ranges at the same time, however.

The present disclosure further relates to the cutting machining (also called gear cutting machining) of a gear wheel workpiece using a cutting tool, which comprises at least two geometrically defined cutting edges.

A method in at least some embodiments includes the chip-producing (gear cutting) machining of a gear wheel workpiece in a machine using a cutting tool, which comprises at least two geometrically defined cutting edges, wherein the cutting edges produce material in chip form on the gear wheel workpiece in the scope of the chip-producing machining. The chip-producing machining is defined by method parameters and the method of at least some embodiments comprises the following steps:

carrying out a computer-assisted analysis of the production of chips on the cutting edges of the cutting tool, carrying out a computer-assisted ascertainment of relative forces which will occur during the production of chips on the cutting edges of the cutting tool, optimizing the chip-producing machining to prevent the relative forces from exceeding a predetermined limiting value or reaching a limiting range, wherein adapted method parameters are provided by an adaptation of at least one of the method parameters in the scope of the optimization, and carrying out the chip-producing machining (V6) of the gear wheel workpiece (11) using the adapted method parameter(s).

The at least two geometrically defined cutting edges can be arranged on a common cutter or on different cutters in at least some embodiments.

The method is divided in at least some embodiments into preparatory steps (1)-(3) and into a step (4) which is used for the actual chip-producing machining of the gear wheel workpiece.

In at least a part of the embodiments, steps (1) and (2) can be executed partially overlapping or even simultaneously.

To be able to plan the chip-producing machining of the gear wheel workpiece and to be able to carry out the chip-producing machining subsequently in a monitored manner, depending on the approach and embodiment, for example, the relative force effect can be defined as a force per unit of length of a cutting edge, as a torque per unit of length of a cutting edge, as a force per unit of volume of a cutting edge, as a torque per unit of volume of a cutting edge, or as a relative force effect in dependence on the material of the cutter.

To be able to make a statement about the relative force effect on the cutting edges of the gear cutting tool in at least some embodiments, the method forces are analytically ascertained in preparatory steps (1)-(3) (for example, on the basis of systematic studies and the analysis thereof), which act during the cutting machining on the various cutting edges of the active region of a cutter of the gear cutting tool.

At least some embodiments therefore relate to a relative variable (for example, a force or a torque), which is related in some form to a cutting edge of the gear cutting tool.

In at least a part of the embodiments, in preparatory steps (1)-(2) for the chip formation on the gear wheel workpiece, the forces are ascertained which result in the shearing off of the material of the gear wheel workpiece. A mechanical model can be applied, for example, in this case, which depicts the formation of shear planes and/or shear zones. I.e., in this case the path via modeling of the forming procedure is followed for the shear planes and/or shear zones.

In at least a part of the embodiments, in preparatory steps (1)-(2) for the chip formation on the gear wheel workpiece, a linear relationship is assumed between the chip thickness and the corresponding machining force, which helps to reduce the effort for the analytical ascertainment of the method forces.

In at least a part of the embodiments, in preparatory steps (1)-(2) for the chip formation on the gear wheel workpiece, a potential model or an exponential model can also be applied.

During the analyzing and/or modeling of the forming procedure or during the use of a linear, potential, or exponential model, for example, one can make use of existing models and/or data, or one's own models and/or data can be applied and/or one's own systematic studies and the analyses thereof can be performed.

Since up to this point there have been no generally valid analytical formulas for the modeling of the forming procedure during the milling of bevel gears, and since the kinematic conditions can change significantly during the bevel gear milling, the milling of bevel gears can be decomposed into individual method steps (referred to as segmenting here) in at least some embodiments for better analytical study and analysis. For each of these method steps (also referred to as segments here), the relative cutting forces can then be analytically ascertained, which act on individual cutting edges of the active region, or act on a shorter portion of the individual cutting edges.

If it results from the method that a force effect is supposed to result on at least one point of at least one of the cutting edges of the gear cutting tool, which is above a limiting value, which reaches a limiting range or leaves it, the method can thus provide/trigger one or more of the following reactions:

issuing a warning (optical and/or acoustic);

producing a (graphic) representation on a display screen, wherein, for example, at least the point of the at least one cutting edge is identified at which an excessively large force effect is expected;

issuing a message (for example, on a mobile system or via a network);

starting a (renewed) design routine to be able to modify at least one method parameter of the machining method.

Since the method can compute the force effect to be expected by means of process simulation and chip analysis, a software module can be provided which ascertains in reverse, in the case of a local overload to be expected, which method parameters result in this local overload. As soon as these method parameters have been found, the software can propose modifications in an optional step. In this case, the user can be prompted to accept a proposed modification. The steps may then be carried out again using the modified method parameter(s). At the end of the corresponding optimization, the method branches back in the direction of the machining of the gear wheel workpiece.

In the meaning of the present description and claims, inter alia, the following variables, parameters, values can be understood as method parameters:

cutting speed, and/or
advance speed, and/or
plunging speed, and/or
rolling speed, and/or
angular speed(s) in the machine, and/or
the speed of other linear movements in the machine, and/or
type of the interpolation of axial movements of the machine, and/or
pressure, and/or
acceleration(s).

Regulating variables and/or control variables are also understood as method parameters in the meaning of the present description and claims. The cutting edge geometry of the cutter(s) are also considered as method parameters, for example, the cutting edge location, wedge angle, rake angle, free angle, and the preparation of the cutting edges.

In the meaning of the present description and claims, the selection of the cutterhead and/or the cutterhead indexing, the material of the cutters, and/or the selection of the cutting process (for example, plunging rolling instead of single rolling) are also considered to be method parameters.

If it results from the method that a force effect is supposed to result on at least one point of at least one of the cutting edges of the gear cutting tool which, for example, is significantly below a limiting value or outside a limiting range, at least one method parameter of the machining method can thus be modified for the purposes of optimizing the method such that the force effect on the point of the relevant cutting edge is closer to the limiting value or within the limiting range.

Since the method can compute the force effect to be expected by means of process simulation and chip analysis, a software module can be provided which ascertains in reverse in the case of an excessively low load of a cutting edge (for example, numerically iteratively), which method parameters result in this excessively low load. As soon as these method parameters have been found, the software can propose modifications in an optional step. In this case, the user can be prompted to accept a proposed modification. The steps may then be carried out again using the modified method parameter(s). At the end of the corresponding optimization, the method then branches back in the direction of the machining of the gear wheel workpiece.

However, there are also other cutting tools (for example, one-piece cutterheads), which can be used in the scope of the method disclosed herein. In general, these are cutting tools which comprise at least two geometrically defined cutting edges on one cutter or on two different cutters.

Tooth flanks having high-quality surfaces can be manufactured efficiently and economically/productively, wherein the force effect on the individual cutting edges can be planned/monitored.

As a result, the use provides gear wheels, for example, spiral-toothed bevel gears, having high accuracy and high-quality surfaces, wherein the maximum possible service life of the cutting tool is utilized as much as possible.

The present disclosure may be applied, for example, to gear cutting tools in which more than only one geometrically defined cutting edge is used in a chip-removing manner simultaneously. For example, at least some embodiments may be applied to gear cutting tools which are equipped with at least two profile cutters or with at least two bar cutters or with at least two cutting plates.

The present disclosure enables the maximum possible service life of the cutting tool to be utilized by the thermal and/or mechanical overload of gear cutting tools being avoided by targeted planning.

With the aid of the method disclosed herein, the load of the cutting edges to be expected can be ascertained in a part or for all (time) sections of the cutting machining method. If excessively large forces should be predicted, other method parameter(s) can thus be selected, for example. If excessively small forces should be predicted, other method parameter(s) can thus be selected, for example, to achieve optimization.

This summary is not exhaustive of the scope of the aspects and embodiments of the invention. Thus, while certain aspects and embodiments have been presented and/or outlined in this summary, it should be understood that the inventive aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow, but in any case are not exhuastive or limiting.

It should also be understood that any aspects and embodiments that are described in this summary and elsewhere in this application and do not appear in the claims that follow are preserved for later presentation in this application or in one or more continuation patent applications.

BRIEF DESCRIPTION OF THE DRAWINGS

Exemplary embodiments, which are understood not to be limiting, will be described in greater detail hereafter with reference to the drawings.

FIG. 2A-2C schematically show details of an exemplary ARCON cutterhead from Klingelnberg, according to the prior art;

FIG. 3 schematically shows a perspective view of a rake face and the three cutting edges which enclose this rake face;

FIG. 5 schematically shows a tabular representation of exemplary intermediate results of a method;

FIG. 6 schematically shows a tabular representation of exemplary intermediate results of another method;

DETAILED DESCRIPTION

To be able to better describe the dynamically changing loads which can occur on a gear cutting tool, reference is made hereafter by way of example and solely schematically to a cutterhead system from Klingelnberg.

Figure 1B:
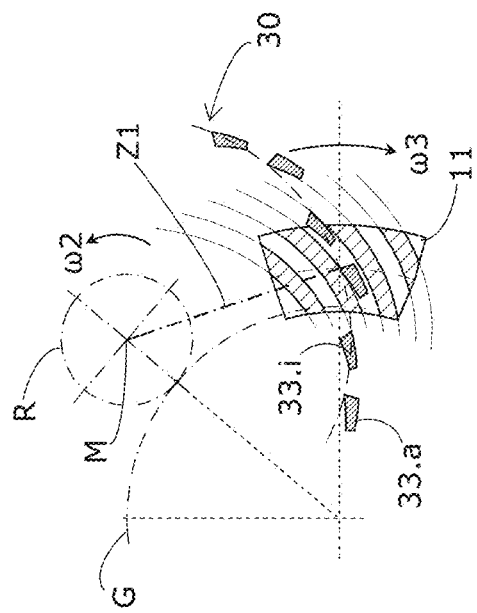
FIG. 1B schematically shows an illustration of a continuous rolling indexing method (for example, a cyclo-palloid method) according to the prior art.
Figure 1A:
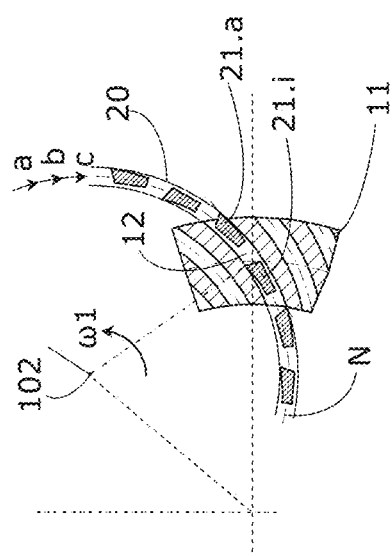
FIG. 1A schematically shows an illustration of a single indexing method according to the prior art.
Figure 1C:
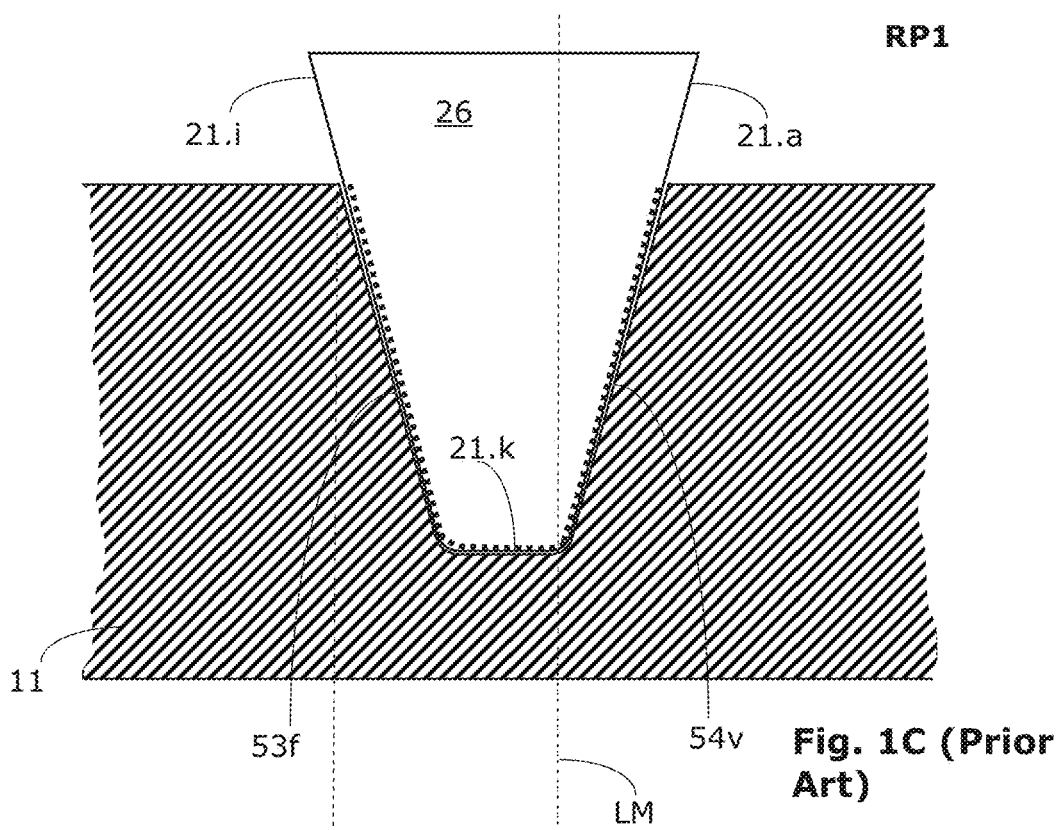
FIG. 1C schematically shows a sectional illustration of a first machining phase of a semi-completing single indexing method according to the prior art, during the finish gear cutting of a left flank and the simultaneous rough gear cutting of a right flank of a bevel gear workpiece.
Figure 1D:
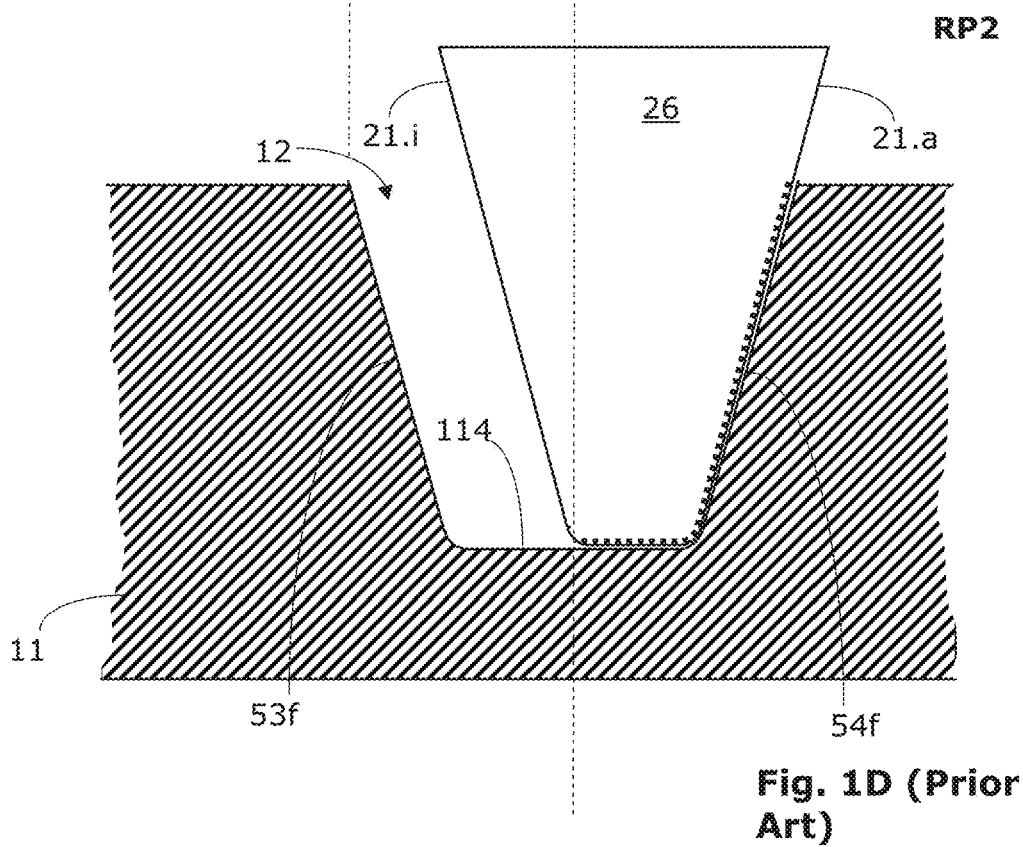
FIG. 1D schematically shows a sectional illustration of a second machining phase of the semi-completing single indexing method according to the prior art, during the finish gear cutting of the right flank of the bevel gear workpiece of FIG. 1C.

This is a cutterhead system here which is designed for use for a single indexing gear cutting method (single indexing method). The basic aspects of such a single indexing method have been explained at the outset on the basis of FIG. 1A. A continuous indexing method, as explained at the outset on the basis of FIG. 1B, and other processes, may also be utilized.

In FIG. 2A, which is described at the outset, the cutting force is indicated by an arrow S (the length of the arrow is proportional to the dimension of the force and the orientation indicates the direction). The cutting force S is essentially perpendicular to the rake face 27. This cutting force S is a vector which is a function of the time t, therefore the reference sign S(t) is also used here.

Since the force effect on the cutting edges of the tool 20 is important here, the cutting force S was decomposed in FIG. 3 into three smaller arrows or vectors K.i, K.a, and K.k, which act in opposition. A force allocation is performed here to be able to more accurately judge the forces which act on the individual cutting edges.

The three vectors K.i, K.a, and K.k form a force equilibrium in three-dimensional space together with the cutting force S. K.i describes the total of all partial forces which act on the inner cutting edge 21.i, K.a describes the total of all partial forces which act on the outer cutting edge 21.a, and K.k describes the total of all partial forces which act on the head cutting edge 21.k. However, this is only a very simplified snapshot on the time axis here.

During the gear cutting of a gear wheel workpiece 11 using the cutting edges of the tool 20, the totals of these partial forces are subject to a continuous change. In this case, not only the dimension thereof but rather also the orientation thereof can change. Moreover, the starting points can travel along the cutting edges. The points of the cutting edges at which the totals of the respective partial force K.i, K.a, and K.k start are referred to as starting points.

Since the tool 20 is rotationally driven by a tool spindle of a machine, the dimensions of which are known, the relative forces can also always be expressed as relative torques. If the orientation and length of the cutting edges in space and the distance of the relative forces to the axis of rotation of the tool spindle are known, the relative forces can thus be converted into relative torques.

In at least some embodiments, relative forces and/or relative torques can be used to be able to judge the force effect on at least two cutting edges. Since the spindle drive of the tool spindle is fed with current, in at least some embodiments, for example, the power consumption of the spindle drive (or a winding of the spindle drive) per millimeter of cutting edge length can also be used.

In a plunging process, for example, linear tooth flanks result on the gear wheel workpiece from the linear cutting edges of the gear cutting tool 20. In the rolling process, the tooth flanks result on the gear wheel workpiece by way of the envelopes of numerous profiling cuts. In this case, the movements are significantly more complex and the forces which occur on the cutting edges are also only to be determined with a significantly greater computing effort.

If, for example, modifications of the tooth flank topography are performed during the gear cutting of gear wheel workpieces, the corresponding relative movements of gear cutting tool and gear wheel workpiece are thus still significantly more complex.

Accordingly, the dimension, orientation, and the starting point of the cutting force S can also change, wherein the cutting force S forms a force equilibrium with the partial forces K.i, K.a, and K.k, as already mentioned. The partial forces are therefore also functions of the time t, as indicated by the reference signs K.i(t), K.a(t), and K.k(t).

In at least some embodiments, the cutting edges can be divided into smaller portions (for example, into individual lines or points). In this case, the relative forces and/or the relative torques and/or the relative current and/or power consumptions are also divided into portions.

As described at the outset in conjunction with FIGS. 1A-1D, the number of cutters which operate by cutting at a given point in time can vary. I.e., the total drive force (or the power consumption, respectively) of the spindle drive of the tool spindle of the tool 20 is decomposed into multiple cutting forces S, which can each have a different dimension, orientation, and a different starting point on the rake faces 27 in use. If the gear cutting tool 20 is to be driven, for example, at a constant speed of the tool spindle in spite of the chronologically changing counter forces, the NC controller of the spindle drive then has to permanently readjust the current. With increasing partial forces on the cutting edges, the spindle drive has to respond with a larger drive torque, i.e., the current which is applied has to be increased. If the total of the partial forces is reduced, the current then has to be reduced to reduce the drive torque, in order to thus keep the speed constant.

An approach may be taken that enables the relative force effects on the cutting edges of a gear cutting tool to be monitored as accurately as possible and relationships/effects of individual method parameters to be recognized.

According to at least some embodiments, the forces K.i., K.a, and K.k to be expected can be computed as a function of time before the actual gear cutting.

If one assumes only one force effect per cutting edge and if one assumes for simplification that the forces act over the entire cutting edge lengths (which does not apply to the snapshot of FIG. 1C), the relative force effect can then be computed in that the presently acting force is divided in each case by the absolute cutting edge lengths. 1000 N which act on a cutting edge having shorter cutting edge length result in a significantly higher relative force effect than 1000 N which act on a cutting edge having longer cutting edge length.

In at least some embodiments, one cutting-edge-specific maximum force can be defined per cutting edge and/or one relative, cutting-edge-specific maximum force effect can be defined per cutting edge.

At least some embodiments therefore relate to relative variables which are related in some form to cutting edges of the gear cutting tool.

To be able to cover the different variants of this approach, these relative variables are referred to here as relative, cutting-edge-specific force specification or in short as relative, cutting-edge-specific force. I.e., these relative variables can be, for example, a (maximum) force in relation to a specific cutting edge, or it can be a (maximum) force in relation to a geometry specification (for example, a (partial) length, (partial) area, or a (partial) volume) of a specific cutting edge. The area and the volume are related directly to the (partial) length of the corresponding cutting edge. A conversion is therefore possible.

As already mentioned, torques and/or the power consumption can also be used as relative variables instead of the force.

Moreover, there is also a direct relationship between the force which acts on a (partial) length of the corresponding cutting edge and the cutting work which acts on the corresponding (partial) volume to sever a chip.

In embodiments which operate with a relative force which is related to a specific cutting edge, this relative force can be defined, for example, for the first cutter of a tool 20 as K.i1 [N] for the inner cutting edge, as K.a1 [N] for the outer cutting edge, and as K.k1 [N] for the head cutting edge. The relative force for the second cutter of the same tool 20 is then defined as K.i2 [N] for the inner cutting edge, as K.a2 [N] for the outer cutting edge, and as K.k2 [N] for the head cutting edge, etc. A relative force can thus be assigned to one or more, e.g., every, cutting edge of one or more, e.g., every, cutter of a tool 20. The nomenclature used here is to be understood as solely an example.

If a tool 20 comprises, for example, multiple cutter groups (e.g., an outer cutter, a middle cutter, and an inner cutter), in at least some embodiments, the same relative forces can then be assigned to one or more, e.g., every, cutter of such a group, for example.

To prevent a temporary overstrain or even the failure of a cutting edge, maximum values can respectively be specified (as limiting values) individually for each cutting edge in at least some embodiments.

The force can then be expressed in each case as an absolute value in N if the length of the respective cutting edge is a known dimension. An outer cutting edge 21.*a*, whose length is, for example, 20 mm, can be assigned, for example, of maximum relative force K.amax=2000 N (the word "relative" in this context indicates that the force is in relation to a specific cutting edge). This corresponds in principle to a relative, cutting-edge-specific maximum force of rK.amax=2000 N/20 mm=100 N/mm.

By way of this approach, it is possible to prevent excessively large forces from occurring instantaneously and/or locally on individual cutting edges during the gear cutting of a gear wheel workpiece.

For this purpose, depending on the approach and embodiment, for example, the relative force effect can also be defined as a force per unit of length of a cutting edge, as a torque per unit of length of a cutting edge, as a force per unit of volume of a cutting edge, as a torque per unit of volume of a cutting edge, or as a power consumption per unit of length of a cutting edge. To remain with the numeric example which proceeded previously from the force K.amax=2000 N, the relative force effect can be established as the force per unit of length of this cutting edge having the maximum value 100 N/mm (as the limiting value).

Figure 4:
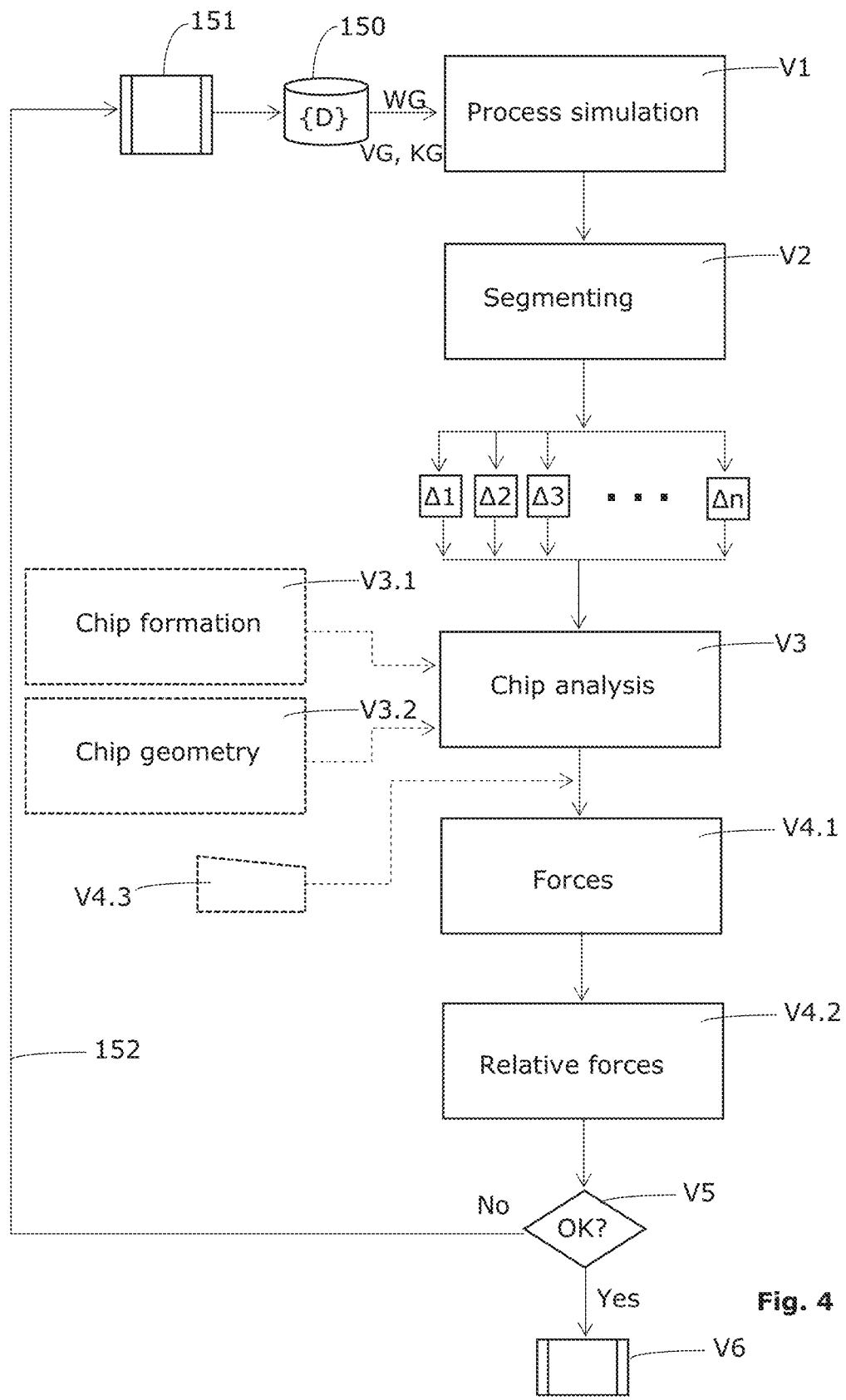
FIG. 4 schematically shows a flow chart of the steps of a method.

The exemplary steps of a first embodiment of a method are described on the basis of FIG. 4, which shows a flow chart in schematic form.

The method can begin in at least some embodiments, for example, with the simulation (also referred to as planning here) of a gear cutting process. A first preparatory step is provided in FIG. 4 with the reference sign V1. The gear hobbing, for example, of a bevel gear workpiece can be simulated by computation (i.e., computer-assisted) here. Suitable software can be used for the simulation of the gear cutting process, for example (for example, software which operates by means of FEM).

The computational (i.e., computer-assisted) simulation in step V1 can be supplied, for example, by data {D}, as indicated in FIG. 4. These data {D} can be taken from a memory 150. The data {D} can be provided beforehand, for example, in the scope of a design of the gear wheel workpiece to be machined, by a combination of computer and software 151. The data {D} can also be transferred directly (without (intermediate) storage) by a combination of computer and software 151 to step V1.

The computational (i.e., computer-assisted) simulation in step V1 can be supplied in at least some embodiments, for example, with specifications/data for the three-dimensional definition of the gear wheel workpiece, identified here as WG.

The computational (i.e., computer-assisted) simulation in step V1 can be supplied in at least some embodiments, for example, with specifications/data for the three-dimensional definition of the gear cutting tool 20 and/or the relevant cutting edges, identified here as VG. The specifications/data can describe, for example, the geometry of the cutterhead 20 equipped with bar cutters 23 and the cutting edge geometry (for example, as a two-dimensional or three-dimensional polygon traverse).

The computational (i.e., computer-assisted) simulation in step V1 can be supplied in at least some embodiments, for example, with specifications/data for the definition of the machine and/or the kinematics, identified here as KG.

These variables are referred to in summary here as method parameters.

It is indicated in FIG. 4 that the simulation in step V1 can be supplied with specifications/data WG and/or VG and/or KG.

In a following step V2, for example, a type of segmenting can be performed. Segmenting refers here to a dividing method, which enables it to decompose the gear cutting process into time windows and/or length sections and/or volumetric dimension sections.

The result of the segmenting V2 is represented in FIG. 4 by multiple squares which are provided with the reference signs Δ1 to Δn. n identifies the number of the segments here. The greater the number n of the segments is, the more accurately may statements be made about the chip formation and the occurring forces on the individual sections of the cutting edges of the active region 26.

The more complex the gear cutting process, i.e., the more dynamic load changes are expected during the gear cutting, the more segments Δn (e.g., time windows and/or length sections and/or volumetric dimension sections) are to be applied. A gear cutting process which is only subject to minor load variations can be defined sufficiently accurately by a few time windows, length sections, and/or volumetric dimension sections. A gear cutting process which is subject to numerous load variations, in contrast, should be defined by more time windows, length sections, and/or volumetric dimension sections.

For each of the n segments, in at least some embodiments, for example, the geometry of the chips to be expected can be ascertained by computation. The ascertainment of the chip geometry can be performed, for example, on the basis of a penetration computation, wherein this penetration computation describes the movement of the cutting edge of the active region 26 through the material of the gear wheel workpiece. In the penetration computation, for example, two surfaces or bodies can be computed for each of the n segments of the present tool envelope body on the basis of the cutting edge geometry and the kinematics by subtraction. The geometry of the chips can be computed, for example, from the present tool envelope body. In the scope of the penetration computation, for example, it can also be computed for each of the n segments which region of the workpiece is cut by which (length) section of the tool cutting edges. The corresponding length specifications are required if the method takes into consideration the force effect in relation to the cutting edge length presently in use (for example, in N per millimeter).

A computer-assisted chip analysis is performed in a subsequent step V3.

If more than only one chip results in one of the n segments (for example, since a chip breakaway occurs), for example, a mean value of all chips for this segment can thus be formed in the scope of the chip analysis V3. On this path, the geometry of an average imaginary chip is obtained for the corresponding step. The geometry of the average imaginary chip can then be used in the further steps.

If more than only one chip results in one of the n segments, for example, a statistical analysis of all chips for this segment can be performed in the scope of the chip analysis V3. On this path, the geometry of a statistical imaginary chip is obtained for the corresponding segment. The geometry of the statistical imaginary chip can then be used in the further steps.

If more than only one chip results in one of the n segments, for example, a maximum value observation can thus alternatively be carried out in the scope of the chip analysis V3, for example, to ascertain the largest (thickest) chip for the corresponding segment. The geometry of the largest (thickest) chip can then be used in the further steps. In the maximum value consideration, it is presumed that during the production of the largest (thickest) chip, the greatest forces also occur at the cutting edges of the active region 26.

The chip analysis V3 can be designed in at least some embodiments, as indicated in FIG. 4, as a functional block or module, wherein this functional block or this module, respectively, analyzes the geometry of the chips of the n segments. If segmenting of geometric variables is not performed, the functional block or the module can then analyze the geometry of the chips of the cutting edges.

The chip analysis V3 can be based in at least some embodiments on a computation, evaluation, or consideration of the geometry of the chips (optional step V3.2 in FIG. 4). In a following step (for example, partial steps V4.1, V4.2 in FIG. 4), a statement is then made about the forces which occur at the cutting edges of the active region 26 via the geometry.

Limiting values and/or limiting ranges can be predetermined, (they can be loaded from a memory, for example), or a user can be prompted to input one or more limiting values (for example, rKmax), which is indicated in FIG. 4 by optional step V4.3.

However, the chip analysis V3 can also be based in at least some embodiments on a computation, evaluation, or consideration of the procedure of the chip formation (optional step V3.1 in FIG. 4). In a subsequent step, based on the procedure of the chip formation, a statement is then performed about the forces (for example, partial steps V4.1, V4.2 in FIG. 4), which occur at the cutting edges of the active region 26.

The chip analysis V3 can also comprise n parallel functional blocks or modules in at least some embodiments, wherein each of the functional blocks or modules analyzes the geometry of the chips of one of the cutting edges or one of the n segments quasi in parallel.

To be able to make a statement about the relative force effect on the cutting edges of a gear cutting tool (for example, partial step V4.1, V4.2 in FIG. 4), in at least some embodiments, the method forces are analytically ascertained (for example, from the geometry of the chips V3.2 and/or from the procedure of the chip formation V3.1), which act on the various cutting edges of the active region 26 of a cutter during the chip-removing gear cutting.

To be able to make a statement about the relative force effect on the cutting edges of a gear cutting tool (for example, partial steps V4.1, V4.2 in FIG. 4), in at least some embodiments, the method forces are analytically ascertained dynamically, i.e., the relative movements changing with the time t are also incorporated into the analysis.

In at least a part of the embodiments, for the chip formation (optional step V3.1 in FIG. 4) on the gear wheel workpiece, the forces are ascertained which result in shearing off of the material of the gear wheel workpiece. A mechanistic model, for example, can be applied in this case, which depicts the formation of shear planes and/or shear zones. I.e., in this case the path via modeling of the forming procedure is followed.

In at least a part of the embodiments, for the chip formation (optional step V3.1 in FIG. 4) on the gear wheel workpiece, a linear relationship is assumed between the chip thickness and the corresponding machining force, which helps to reduce the effort for analytically ascertaining the method forces.

In at least a part of the embodiments, for the chip formation (optional step V3.1 in FIG. 4) on the gear wheel workpiece, a potential model or an exponential model can also be applied.

Upon modeling of the forming procedure or upon use of a linear, potential, or exponential model, for example, existing models and/or data can be used, or one's own models and/or data and/or analyses can be applied. The data can be defined beforehand, for example, on the basis of experiential values and/or ascertained experimentally and/or empirically and/or analytically.

As illustrated by way of example in FIG. 4, the ascertainment of the forces can optionally be divided into two partial steps V4.1, V4.2, wherein this division was only performed here for better illustration. The corresponding forces can also be ascertained in one step.

After the chip analysis in step V3, the absolute forces can be ascertained (partial step V4.1), which occur during the machining of the gear wheel workpiece. These forces can be ascertained, for example, as a function of the time, or the forces can be ascertained, for example, for each of the segments n.

The relative forces can then be ascertained from these forces in a partial step V4.2. The relative forces are distinguished in that, as already described, they have a reference to the cutting edges in use.

A possible nomenclature for the identification of the relative forces has already been described above, which can be applied here. This nomenclature is to be understood solely as an example and is to serve for better explanation of the relationships.

The result of partial step V4.2 is shown in FIG. 5 on the basis of n tables (each of these tables reflects the relative forces which occur for one of the segments 1-n). Each of the n tables bears the designation of the relevant segment (for example, $\Delta 1$) in the uppermost line. Three columns K.i1, K.a1, K.k1, then follow, wherein K.i1 specifies the relative force in [N] which acts on the inner cutting edge 21.$i$, K.a1 specifies the relative force in [N] which acts on the outer cutting edge 21.$a$, and K.k1 specifies the relative force in [N] which acts on the head cutting edge 21.$k$.

As can be seen in FIG. 5, the n tables comprise a lowermost line, in which an individual maximum force can be specified as the limiting value in [N] for each of the three cutting edges 21.i, 21.a, 21.k. In the present numeric example, 2000 N was predetermined as the upper limiting value for each of the cutting edges 21.i, 21.a for each of the n segments. For the head cutting edge 21.k, 500 N was predetermined as the upper limiting value for each of the n segments.

A consideration of these numeric examples results in the following image. During the first segment n=1, all forces are significantly below 2000 N or 500 N, respectively. During the second segment n=2, however, the force on the outer cutting edge 21.a exceeds 2000 N by 500 N. The corresponding field of the table has a gray background. During the last segment n, all forces are again below 2000 N or 500 N, respectively.

The ascertainment of the relative forces (step V4.2) may be carried out in a computer-assisted manner in at least some embodiments to be able to judge the forces to be expected before the actual cutting machining of the gear wheel workpiece using the cutting edges of a tool.

Step V4.2 would indicate or communicate in the example shown to the operator of the machine or another user that an impermissibly high force effect can occur, for example, on the outer cutting edge 21.a during the second segment n=2.

The operator/user can now decide whether he nonetheless wishes to carry out the cutting machining of the gear wheel workpiece in the planned form, or whether he wishes to modify, for example, the specifications for the process simulation, which was designated as step V1. For this purpose, the method can lead back, for example, to the combination of computer and software 151, for example, to enable a different design and/or to predetermine different kinematics (for example, having reduced cutting depth). The selection of a different design and/or different kinematics is identified here as adaptation of the method parameters.

In FIG. 4, the computation, the evaluation, or the observation of the results of step V4.2 is identified with the reference sign V5. If all values are okay, or if the operator/user wishes to nonetheless carry out the cutting machining of the gear wheel workpiece in the planned form, the gear cutting machining follows in step V6.

If at least one of the values is not okay, the method can branch back to the design, for example, as indicated by the branch for 152 in FIG. 4.

The arrow 153 in FIG. 5 indicates that the method can generally branch here (for example, as shown in FIG. 4).

If it results from the method that a force effect is supposed to result on at least one point of at least one of the cutting edges of the gear cutting tool which is above a limiting value, the method can thus provide/trigger one or more of the following reactions:

issuing a warning (optical and/or acoustic);

generating a (graphic) representation on a display screen, wherein in at least some embodiments at least the point of the at least one cutting edge at which an excessively large force effect is expected is identified;

issuing a message (for example, to a mobile system or via a network);

starting a (renewed) design routine to be able to change at least one method parameter of the machining method.

Since the method can compute the force effect to be expected by means of the process simulation V1 and the chip analysis V3, a software module can optionally also be provided, which ascertains in reverse in the case of a local overload to be expected which method parameters result in this local overload. As soon these method parameters have been found, the software can propose modifications in an optional step (for example, as a representation on a display screen). In this case, the user can be prompted to accept a proposed modification (for example, by actuating a key combination). Steps V1-V5 may then be carried out again using the modified method parameter(s). In step V5, the method then branches in the direction of V6.

After a renewed design, or after a modified design, i.e., as soon modified method parameters are provided, it is possible to run through steps V1 up to and including V5 again.

Since the computation of the chip geometry or the chip thickness, respectively, during the various phases of the chip-removing method cannot always be entirely exact, a variance of the chip thickness can be taken into consideration in at least some embodiments. If, for example, experiments have shown that the computed chip thickness can vary by ±10%, the presently ascertained values of the tables can then be provided, for example, with a variance (abbreviated Var.) of ±10%. A corresponding numeric example is shown in FIG. 6.

An observation of these numeric examples of FIG. 6 results in the following picture. During the first segment n=1, all forces are significantly below 2000 N or 500 N, respectively. During the second segment n=2, however, the force on the outer cutting edge 21.a can exceed 2000 N by 750 N and the force on the head cutting edge 21.k can exceed 500 N by 28 N. The corresponding fields of the table have a gray background. The method branches back here, as symbolized by the arrow 153. During the last segment n, all forces are again below 2000 N or 500 N, respectively.

Figure 7A:
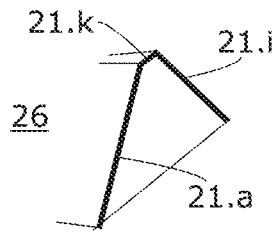
FIG. 7A schematically shows a perspective view of a rake face and the three cutting edges which enclose this rake face.
Figure 7B:
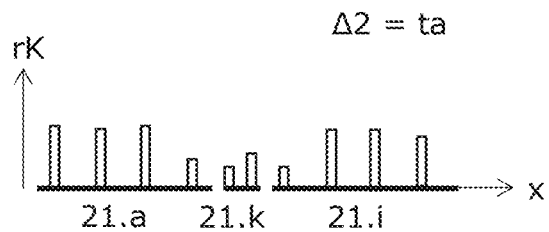
FIG. 7B schematically shows the force effect on the three cutting edges as a function of the distance x in the form of a schematic diagram.

Details of another embodiment are shown in FIGS. 7A and 7B on the basis of a further example. FIG. 7A shows, similarly to FIG. 3, details of the active region 26, for example, of a bar cutter. The three cutting edges of this bar cutter are provided, as already described, with reference signs 21.a, 21.i, and 21.k. FIG. 7B shows a linear arrangement of these three cutting edges 21.a, 21.i, and 21.k, wherein the relative force rK (for example, in [N/mm]) is plotted on the vertical axis and the distance x is plotted on the horizontal axis. The force effect on the cutting edges 21.a, 21.i, and 21.k can be represented as a function of the distance x. In FIG. 7B, however, an example is shown in which the respective acting relative force is represented by a bar at four points of the outer cutting edge 21.a and at four points of the inner cutting edge 21.i. The respective force which acts on the head cutting edge 21.k is represented by two bars.

A point in time t=ta has been established here as a segment 42, which can define a time window, for example.

The force effect on the cutting edges 21.a, 21.i, and 21.k can be ascertained in at least some embodiments per segment Δn in the form of one or more discrete values (represented by bars here), or the force effect on the cutting edges 21.a, 21.i, and 21.k can be ascertained in at least some embodiments per segment Δn, for example, in the form of a function of the distance x.

If the force effect is provided, for example, as a function of the distance x, the maximum of the corresponding curve profiles can thus be ascertained in at least some embodiments on the basis of a maximum value study. This maximum value can then be used to ascertain whether a predetermined maximum value is exceeded as the limiting value (for example, 100 N/mm).

Figure 7C:
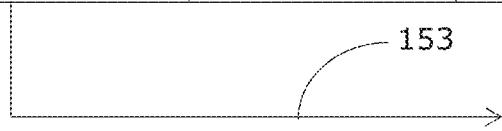
FIG. 7C schematically shows a tabular representation of exemplary intermediate results of a method according to FIG. 7B.

The result of partial step V4.2 is shown in FIG. 7C on the basis of 2 tables (each of these tables reflects the relative forces which occur for one of the segments Δ1 and Δ2. Each of the 2 table bears the identification of the relevant segment (Δ1 and Δ2) in the uppermost line. Three columns K.a1, K.k1, K.i1 then follow, wherein for K.i1 the data set of the relative forces in [N/mm] is specified which act on the inner cutting edge 21.$i$, for K.a1 the data set of the relative forces in [N/mm] is specified which act on the outer cutting edge 21.$a$, and for K.k1 the data set of the relative forces in [N/mm] is specified which act on the head cutting edge 21.$k$. The two data sets of the outer cutting edge 21.$a$ and the inner cutting edge 21.$i$ each comprise four discrete values here and the data set of the head cutting edge 21.$k$ comprises two discrete values.

An observation of these numeric examples of FIG. 7C results in the following picture. During the first segment n=1, all forces are significantly below 100 N/mm, which was predetermined as the limiting value rKmax. During the second segment n=2, the relative force on the outer cutting edge 21.$a$ exceeds 100 N/mm with a value around 10 N/mm and with a value of 5 N/mm. the corresponding values of the table have a gray background. The method also branches back here, as symbolized by the arrow 153.

Instead of tables, an interactive graphic representation is also possible in which the respective relative load is shown graphically (color-coded and height-coded) as a function of the time, rolling angle, and/or plunging distance (interactively displaceable via a controller) over the cutting edge (for example, as a projection in a plane of the drawing or also 3D).

A division of the cutting edges into length sections may be performed here, as illustrated on the basis of the example of FIGS. 7A-7C. It may thus be recognized by the analysis of the data sets in which length sections of a cutting edge the highest local forces instantaneously occur.

Instead of performing a division into length sections, a division into time segments can additionally or alternatively be performed.

In at least some embodiments, the relative forces which occur on the cutting edges can be computed from the respective chip thickness. It can be assumed as a simplification in this case that the production of the greatest chip thickness also requires the application of the greatest forces on the corresponding cutting edge. In these embodiments, one thus precedes from a direct proportionality between chip thickness and relative force for simplification.

In at least some embodiments, however, the chip formation (optional step V3.1) and/or the three-dimensional geometry of the chips (optional step V3.2), can instead be analyzed more precisely instead of only the chip thickness. In this case, for example, one can observe various types of chip formation or the various zones on the chip, respectively, in the chip formation. It is known, for example, that a stagnation and severing zone forms at a cutting wedge in front of the main cutting edge in the transition region between the rake face 27 and the free face adjoining thereon (for example, the free face 28.$a$). The forces acting on the cutting edge are greatest there, i.e., the relative force typically also has a maximum there. The zone here is the one in which the material is severed.

In addition to the stagnation and severing zone, the shear zone on the rake face 27 can also be observed. The relative forces are somewhat less there than in the region of the stagnation and severing zone.

During the cutting machining of a gear wheel workpiece using the cutting edges of a tool, these cutting edges are subject to a certain wear. Greatly varying forms of wear are known in this case. The forms of wear, which typically form in the various length sections of the various cutting edges, can be established on the basis of worn tools. If, for example, the head cutting edge should be subject to a different form of wear (for example, cracking) than, for example, the outer and inner cutting edges (for example, cutting edge rounding due to abrasion). Different maximum values can thus be established especially for the head cutting edge than, for example, for the outer and inner cutting edges. This approach finally enables an improvement of the service life of the entire (bar) cutter.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A method comprising the steps of:
1) computer-assisted analysis of simulated production of chips during simulated machining of a gear wheel workpiece in a machine using a cutting tool comprising at least two geometrically-defined cutting edges configured to produce material in chip form from the gear wheel workpiece during said simulated machining, wherein the simulated machining is defined by machining parameters;
2) computer-assisted prediction of forces on the cutting edges of the cutting tool during the simulated production of chips;
(3) modifying at least one of the machining parameters such that the predicted forces do not exceed a predetermined value or are not within a defined range; and
(4) chip-producing machining of the gear wheel workpiece using said cutting tool and said modified at least one of the machining parameters;
the method further including, during steps 1)-3), determining expected load on the cutting edges of the cutting tool for a part or for all time sections of the simulated chip-producing machining.

2. The method according to claim 1, further comprising segmenting said simulated machining into separate machining segments before or during step 1).

3. The method according to claim 2, wherein said segmenting includes dividing said simulated machining into separate points in time, time intervals, or length sections of the cutting edges, and step 2) includes predicting said forces for each of the segments.

4. The method according to claim 3, wherein step 2) includes computer-assisted chip analysis determining at least one of procedure of chip formation by the simulated machining and chip geometry of chips formed by the simulated machining.

5. The method according to claim 3, further including, during step 2), computer-assisted chip analysis using at least one of:
a mechanistic model modeling formation of at least one of shear planes and shear zones;
a model assuming a linear relationship between chip thickness and corresponding force required to achieve the chip-producing machining;
a potential model; and
an exponential model.

6. The method according to claim 1, wherein step 2) includes computer-assisted chip analysis including determining at least one of procedure of chip formation by the simulated machining and chip geometry of chips formed by the simulated machining.

7. The method according to claim 1, further including, during step 2), computer-assisted chip analysis using at least one of:
a mechanistic model modeling formation of at least one of shear planes and shear zones;
a model assuming a linear relationship between chip thickness and corresponding force required to achieve chip-producing machining;
a potential model;
an exponential model.

8. The method according to claim 1, further including prompting a user to input at least one said predetermined value and said defined range.

9. The method according to claim 1, wherein step 3) includes the step of:
3a) determining whether any of the forces exceeds the predetermined value or is within the defined range; and
when any of the forces exceeds the predetermined value or is within the defined range
modifying the at least one of the method parameters so as to bring said any of the forces below the predetermined value or outside of the defined range; and
repeating step 3a) until none of the forces exceeds the predetermined value or is within the defined range; and
when none of the forces exceeds the predetermined value or is within the defined range, then performing step 4).

10. The method according to claim 1, wherein step 3) includes:
3b) determining whether any of the forces is below the predetermined value or outside of the defined range; and
when one of the forces is below the predetermined value or outside the defined range
modifying the at least one of the method parameters so as to bring the one of the forces closer to the predetermined value or into the defined range; and
repeating step 3b) until the one of the forces reaches the predetermined value or is within the defined range; and
when the one of the forces reaches the predetermined value or is within the defined range, performing step 4).

11. The method according to claim 1, wherein the chip-producing machining is a single indexing machining method or a continuous indexing machining method.

12. A method A method comprising the steps of:
1) computer-assisted analysis of simulated production of chips during simulated machining of a gear wheel workpiece in a machine using a cutting tool comprising at least two geometrically-defined cutting edges configured to produce material in chip form from the gear wheel workpiece during said simulated machining, wherein the simulated machining is defined by machining parameters;
2) computer-assisted prediction of forces on the cutting edges of the cutting tool during the simulated production of chips, and computer-assisted chip analysis using at least one of:
a mechanistic model modeling formation of at least one of shear planes and shear zones;
a model assuming a linear relationship between chip thickness and corresponding force required to achieve chip-producing machining;
a potential model;
an exponential model;
3) modifying at least one of the machining parameters such that the predicted forces do not exceed a predetermined value or are not within a defined range; and
4) chip-producing machining of the gear wheel workpiece using said cutting tool and said modified machining parameters.

13. The method according to claim 12, further comprising segmenting said simulated machining into separate machining segments before or during step 1).

14. The method according to claim 13, wherein said segmenting includes dividing said simulated machining into separate points in time, time intervals, or length sections of the cutting edges, and step 2) includes predicting said forces for each of the segments.

15. The method according to claim 12, wherein step 2) includes computer-assisted chip analysis including determining at least one of procedure of chip formation by the simulated machining-and chip geometry of chips formed by the simulated machining.

16. The method according to claim 12, further including prompting a user to input at least one said predetermined value and said defined range.

17. The method according to claim 12, wherein step 3) includes the step of:
3a) determining whether any of the forces exceeds the predetermined value or is within the defined range; and
when any of the forces exceeds the predetermined value or is within the defined range
modifying the at least one of the method parameters so as to bring said any of the forces below the predetermined value or outside of the defined range; and
repeating step 3a) until none of the forces exceeds the predetermined value or is within the defined range; and
when none of the forces exceeds the predetermined value or is within the defined range, then performing step 4).

18. The method according to claim 12, wherein step 3) includes:
3b) determining whether any of the forces is below the predetermined value or outside of the defined range; and
when one of the forces is below the predetermined value or outside the defined range
modifying the at least one of the method parameters so as to bring the one of the forces closer to the predetermined value or into the defined range; and
repeating step 3b) until the one of the forces reaches the predetermined value or is within the defined range; and
when the one of the forces reaches the predetermined value or is within the defined range, performing step 4).

19. The method according to claim 12, wherein the chip-producing machining is a single indexing machining method or a continuous indexing machining method.

* * * * *